United States Patent [19]

Pipper et al.

[11] Patent Number: 5,128,442
[45] Date of Patent: Jul. 7, 1992

[54] CATALYTIC, SOLID STATE PROCESS FOR THE PREPARATION OF LINEAR POLYAMIDES

[75] Inventors: Gunter Pipper, Bad Duerkheim; Wolfgang F. Mueller, Neustadt; Harald Dauns, Weisenheim, all of Fed. Rep. of Germany

[73] Assignee: BASF Aktiengesellschaft, Ludwigshafen, Fed. Rep. of Germany

[21] Appl. No.: 681,255

[22] Filed: Apr. 8, 1991

[30] Foreign Application Priority Data

Apr. 30, 1990 [DE] Fed. Rep. of Germany ....... 4013873

[51] Int. Cl.$^5$ .................... C08G 69/30; C08G 69/28
[52] U.S. Cl. .................................. 528/336; 528/335; 528/337; 528/347; 528/349

[58] Field of Search ............... 528/336, 335, 337, 347, 528/349

[56] References Cited

FOREIGN PATENT DOCUMENTS 0306165 8/1988 European Pat. Off. .

Primary Examiner—Harold D. Anderson
Attorney, Agent, or Firm—Keil & Weinkauf

[57] ABSTRACT

A process for the preparation of a linear polyamide by reacting the appropriate dicarboxylic acid and diamine in a liquid reaction medium with the addition of a catalytically effective phosphorus compound, removing the reaction medium to give a solid salt, precondensing the latter in the solid phase at a temperature of from 140° C. to 5° C. below the melting point of the salt and continuing condensation at a temperature above that used for the precondensation until the desired degree of condensation is reached.

11 Claims, No Drawings

CATALYTIC, SOLID STATE PROCESS FOR THE PREPARATION OF LINEAR POLYAMIDES

Linear polyamides formed from diamines and dicarboxylic acids are usually manufactured by condensing the appropriate salts in the molten state. Such a procedure is less suitable for the more heat-sensitive types of polyamide. Attempts have therefore been made to prepare polyamides from the appropriate salts by condensing the latter in the solid phase. EP-A 306,165 describes such a method, in which a polyamide-forming salt is thoroughly mixed with a hypophosphite catalyst and the resulting mixture is finely dispersed in a hydrocarbon and condensed at a temperature which is below the melting point of the salt. Such a process suffers from the drawback that the polymer formed has to be purified to remove the hydrocarbon used as heat transfer medium and the hydrocarbon must itself be worked up for re-use.

It is thus an object of the present invention to provide a process for the preparation of a linear polyamide by condensation of a polyamide-forming salt in the solid phase, such process being simple to carry out and easy to control whilst dispensing with expensive purifying operations.

This object is achieved by means of a process for the preparation of a linear polyamide formed from a diamine having from 4 to 15 carbon atoms and a dicarboxylic acid having from 4 to 15 carbon atoms by condensation of the appropriate salt in the presence of a phosphorus-containing catalyst in the solid phase, wherein a) a diamine having from 4 to 15 carbon atoms and a dicarboxylic acid having from 4 to 15 carbon atoms are reacted in a liquid reaction medium at elevated temperature, a catalytically effective phosphorus compound being added to give a solution, suspension or dispersion of the salt of said diamine and dicarboxylic acid, which solution, suspension or dispersion has a content of catalytically effective phosphorus compound, b) the solution, suspension or dispersion of the salt of said diamine and dicarboxylic acid having a content of catalytically effective phosphorus compound, as obtained in a), is treated to remove the reaction medium so as to give a solid salt of the said diamine and dicarboxylic acid, which salt has a content of catalytically effective phosphorus compound, c) the solid salt of said diamine and dicarboxylic acid having a content of catalytically effective phosphorus compound, as obtained in b), is heated in the solid phase to a temperature of from 130° C. to 5° C. below the melting point of said salt using an inert gas so as to give a precondensate having a total number of end groups ranging from 5,000 to 12,000 and d) condensation of the resulting precondensate is continued at a temperature above that used in stage c) until the desired degree of condensation is reached.

Our novel process has the advantage of providing even distribution of the catalyst used. Another advantage of the novel process is that it can be controlled in a simple manner and that there is no call for purification of the polyamide or any heat transfer oils. Another virtue of our novel process is that it readily lends itself to continuous operation.

In stage a), a diamine having from 4 to 15 carbon atoms and a dicarboxylic acid having from 4 to 15 carbon atoms are reacted in a liquid reaction medium at elevated temperature and a catalytically effective phosphorus compound is added so as to give a solution, suspension or dispersion of the resulting salt, which solution, suspension or dispersion has a content of the catalytically effective compound.

Preferred diamines are those of formula I

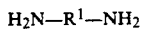

in which $R^1$ denotes an alkylene radical of from 2 to 12 carbon atoms, a 1,4-phenylene or 1,3-phenylene radical or a radical of formula II

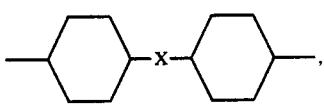

in which X is an oxygen atom, a methylene group, a propylene-2,2-group, a sulfur atom or an —$SO_2$-group. Particularly preferred diamines are $\alpha,\omega$-alkane diamines, especially those having a linear carbon chain. Examples of suitable diamines are diaminobutane-1,4, hexamethylene diamine, octamethylene diamine, decamethylene diamine, 4,4'-diaminodicyclohexylmethane, 4,4'-diaminocyclohexylpropane-2,2, 4,4'-dicyclohexyl ether, p-phenylene diamine and m-phenylene diamine.

In preferred dicarboxylic acids of formula III

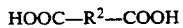

$R^2$ denotes an alkylene radical of from 2 to 12 carbon atoms, a 1,3-phenylene radical or a 1,4-phenyl radical. Examples of suitable compounds are succinic acid, adipic acid, sebacic acid, azelaic acid, terephthalic acid and isophthalic acid.

An advantageous reaction medium having a boiling point of, say, from 60° to 120° C. is water, an alkanol having from 1 to 4 carbon atoms, a mixture thereof or a ketone such as acetone or butanone. The resulting salt is obtained in a dissolved, suspended or dispersed state depending on its solubility in the reaction medium used. Salts of the diamines and dicarboxylic acids stated above are preferably prepared in aqueous solution. For example, the starting solution may be an aqueous solution of dicarboxylic acid having a concentration of more than 10% w/w, in particular more than 20% w/w. It is particularly advantageous to use an aqueous solution which is as saturated as possible. Such aqueous solutions are then caused to react with molten diamine. Alternatively, the starting solution may be an aqueous solution of diamine having a concentration of, advantageously, more than 10% w/w, which solution is then caused to react with solid dicarboxylic acid. Yet another method comprises taking a dilute solution of said salt, dissolving dicarboxylic acid therein and then neutralizing with diamine.

The dicarboxylic acid and diamine will of course be used in stoichiometric amounts. The said reactions are advantageously carried out at a temperature of from 20° to 100° C. and preferably from 60° to 95° C. The pH of the resulting solution is advantageously between 7.0 and 7.8. We have also found it advantageous to prepare concentrated solutions of the resulting salts.

A catalytically effective phosphorus compound is added to the reaction medium during or after the formation of the salt. Examples of suitable phosphorus compounds are phosphoric acid, orthophosphorous acid and hypophosphorous acid and esters and alkali metal salts thereof. Preferred phosphorus compounds are orthophosphorous acid and its alkali metal salts and esters derived from, say, alkanols of up to 12 carbon atoms, cycloalkanols or phenols. A suitable compound is, for example, triphenyl phosphite. Particularly suitable compounds are salts and derivatives of hypophosphorous acid, for example its alkali metal salts, such as sodium hypophosphite, and ammonium hypophosphite.

The catalytically effective phosphorus compound is advantageously added in an amount of from 0.05 to 1.0% w/w and preferably from 0.1 to 0.7% w/w, calculated as phosphorus and based on the solid salt of dicarboxylic acid and diamine.

There is thus obtained a suspension, dispersion or solution of the salt of said diamine and dicarboxylic acid having a content of catalytically effective phosphorus compound.

In stage b), the solution, suspension or dispersion of the salt of said diamine and dicarboxylic acid having a content of catalytically effective phosphorus compound, as obtained in a), is treated to remove the reaction medium so as to give a solid salt of the said diamine and dicarboxylic acid, which salt has a content of catalytically effective phosphorus compound.

This solid salt is conveniently obtained by evaporating off the reaction medium with constant agitation, for example in a Rotavapor or by spray drying. The temperature used for this purpose is preferably not higher than 120° C. There is obtained a solid salt of said diamine and dicarboxylic acid having the stated content of catalytically effective phosphorus compound. Prior to further use, said salt is advantageously pulverized or shaped to granules having a length of, say, 2–4 mm and a width of, say, 2–4 mm or to pellets or balls having a diameter of, say, 1–2 mm.

In stage c), the solid salt of said diamine and dicarboxylic acid having a content of catalytically effective phosphorus compound, as obtained in b), is heated in the solid phase to a temperature of from 130° C. to 5° C. below the melting point of said salt using an inert gas so as to give a precondensate having a total number of end groups ranging from 5,000 to 12,000. Preferably, however, this temperature does not exceed 180° C.

Advantageously, said heating in the solid phase is effected at a temperature of from 140° C. to 10° C. below the melting point of the salt. The inert gas used is advantageously nitrogen or, in particular, superheated steam.

If a pulverized salt is to be condensed, the condensation can be carried out with continuous intermixing, e.g. in a Rotavapor or fluidized bed. In this way, the inert gas continuously removes the water formed during the condensation reaction and a solid phase is maintained throughout.

If a shaped salt is to be subjected to condensation, this can be carried out in, say, a column-type condensation zone through which the shaped salt passes downwardly while the inert gas flows upwardly therethrough, or in a rotary furnace in which the inert gas flows countercurrently.

The condensation is usually carried out over a period of from 10 to 24 hours to give a precondensate having a total number of end groups ranging from 5,000 to 12,000, in particular from 7,000 to 10,000. When the number of end groups has reached this total, this precondensation reaction is advantageously stopped.

Condensation of the precondensate obtained in stage c) is then continued at a temperature above that used in stage c), advantageously at a temperature ranging from 180° C. up to 30° C. above the melting point of the polyamide, until the desired degree of condensation is reached.

This final condensation is advantageously carried out in the solid phase, for example at a temperature above the melting point of the salt to 20° C. below the melting point of the resulting polyamide. It is advantageous to use an inert gas such as nitrogen or superheated steam here, and it is particularly advantageous to effect heating in stages, e.g. in from 2 to 4 stages in each of which the temperature is increased by from 5° to 15° C. This makes precise control of the degree of condensation possible, as may be readily monitored by determining the total number of end groups. Where a powdered salt is used as starting material for the condensation, it will be advantageous to melt the polyamide optionally together with auxiliaries, for example in an extruder, and to granulate the melt.

According to another advantageous embodiment, the precondensate from stage c) is melted in, say, an extruder and granulated. During this procedure, the precondensate is kept in the molten state for less than 4 minutes and preferably for from 1 to 3 minutes. It is also advantageous to work in auxiliaries at this stage, for example dyes, stabilizers, lubricants, fillers and reinforcing agents. The resulting granules are then condensed further in the solid phase using an inert gas as described above until the desired degree of condensation has been reached.

Alternatively, however, the precondensate from stage c) may be melted, for example in an extruder, and then, optionally following the addition of any of said auxiliaries, condensed further in the molten state with constant surface renewal and removal of the water of reaction, under reduced pressure, until the desired viscosity is reached.

The polyamides produced by the process of the invention are suitable for the manufacture of shaped articles by injection molding or extrusion and for the manufacture of filaments and fibers.

The process of the invention is illustrated below with reference to Examples.

EXAMPLES

Example 1

Materials used 1) 1,608.00 g of demineralized water,
2) 1,162,10 g of hexamethylne diamine (10 moles),
3) 1,461.40 g of adipic acid (10 moles),
4) 21.56 g of $H_3PO_2$=0.447% of phosphorus based on the polymer.

Preparation of salt

The starting materials 1) to 3) are put into a 5 liter stirred vessel in the order given and the mixture is neutralized at a temperature of from 75° to 95° C. The phosphorus compound is then added to the aqueous salt solution. The clear solution is then concentrated in a rotary evaporator and the solid salt is dried in a vacuum shelf drier at 60° C. and 20 mbar to a water content of less than 0.1%. The resulting salt is homogenized and either
  a) used in the precondensation stage unchanged, i.e. in the form of a powder, or
  b) shaped prior to use in the precondensation stage.

Precondensation

10 Hours at 160° C. using 100 l/h of nitrogen as inert gas, and 4 hours at 170° C. using 50 l/h of nitrogen as inert gas.

The total number of end groups in the precondensate is found to be 5,200 molar equivalents per kg.

Final condensation

5 Hours at 180° C. using 50 l/h of nitrogen as inert gas,
6 hours at 190° C. using 50 l/h of nitrogen as inert gas,
3 hours at 198° C. using 50 l/h of nitrogen as inert gas.

The end product is either a) a white powder or b) white granules, both having a total number of end groups of from 260 to 270 molar equivalents per kg and a relative viscosity $\eta_{rel}$ of from 2.52 to 2.54, as measured on a 1% solution in 96% sulfuric acid.

Example 2

Materials used 1) 1,608.00 g of demineralized water,
2) 1,162,10 g of hexamethylene diamine (10 moles),
3) 1,461.40 g of adipic acid (10 moles),
4) 95.80 g of triphenyl phosphate (=0.4% of phosphorus based on the polymer).

Preparation of salt

As described in Example 1 followed by shaping as described in 1b).

Precondensation

10 Hours at 160° C. using 100 l/h of nitrogen as inert gas, and 4 hours at 170° C. using 50 l/h of nitrogen as inert gas, The total number of end groups in the precondensate is found to be 8,200 molar equivalents per kg.

Final condensation

7 Hours at 180° C. using 50 l/h of nitrogen as inert gas,
7 hours at 190° C. using 50 l/h of nitrogen as inert gas,
4 hours at 200° C. using 50 l/h of nitrogen as inert gas.

The end product consists of white polymer granules having a total number of end groups of from 320 to 330 molar equivalents per kg and a $\eta_{rel}$ of from 2.40 to 2.45, as measured on a 1% solution in 96% sulfuric acid.

Example 3

Materials used 1) 1,608.00 g of demineralized water,
2) 1,162,10 g of hexamethylene diamine (10 moles),
3) 1,461.40 g of adipic acid (10 moles),
4) 24.50 g of $NaH_2PO_2.H_2O$ = 0.29% of phosphorus based on the polymer

Preparation of salt

As described in Example 1 followed by shaping as described in 1b).

Precondensation

8 Hours at 160° C. using 100 l/h of nitrogen as inert gas, and 7 hours at 170° C. using 50 l/h of superheated steam as inert gas.

The total number of end groups in the precondensate is found to be 7,100 molar equivalents per kg.

Final condensation

7 Hours at 180° C. using 50 l/h of superheated steam as inert gas,
8 hours at 190° C. using 50 l/h of superheated steam as inert gas,
6 hours at 200° C. using 50 l/h of superheated steam as inert gas.

The end product consists of white polymer granules having a total number of end groups of from 290 to 295 molar equivalents per kg and a $\eta_{rel}$ of from 2.40 to 2.45, as measured on a 1% solution in 96% sulfuric acid, a residual extract in methanol of 0.74% and a DSC melting point of 258° C.

Example 4

Materials used 1) 15,000.00 g of demineralized water,
2) 11,600.00 g of hexamethylene diamine,
3) 7,300.00 g of adipic acid,
4) 8,300.00 g of terephthalic acid,
5) 110.40 g of $H_3PO_3$.

Preparation of salt

The starting materials 1) to 4) are put into a 100 liter stirred vessel in the order given, at 95° to 98° C., and the mixture is neutralized. The pH of the resulting salt solution is 7.6. The orthophosphorous acid is then added to the clear salt solution, which is then treated as described in Example 1a).

Precondensation

This is carried out in a rotary evaporator having a capacity of 100 liters.

10 Hours at 170° C. using 500 l/h of nitrogen as inert gas, and 8 hours at 180° C. using 500 l/h of superheated steam as inert gas.

The total number of end groups in the precondensate is found to be 7,600 to 8,000 molar equivalents per kg.

Final condensation

5 Hours at 190° C. using 500 l/h of superheated steam as inert gas,
6 hours at 200° C. using 500 l/h of superheated steam as inert gas,
4 hours at 210° C. using 500 l/h of superheated steam as inert gas.

The end product consists of a white powder having a total number of end groups of from 360 to 380 molar equivalents per kg and a $\eta_{rel}$ of from 2.30 to 2.33, as measured on a 1% solution in 96% sulfuric acid. The powder is melted in a twin-worm extruder to form granules therefrom. The resulting white granules have a total number of end groups of from 340 to 348 molar equivalents per kg, a relative viscosity $\eta_{rel}$ of from 2.38 to 2.44, as measured on a 1% solution in 96% sulfuric acid, and a DSC melting point of 302° C.

Example 5

A salt is prepared as described in Example 4 and precondensation is carried out in the manner described.

The precondensate having a total number of end groups of from 7,600 to 8,000 molar equivalents per kg is fed to a twin-worm extruder and melted at a material temperature of not more than 340° C., after which it is solidified in water and granulated. The granules, which have a total number of end groups of from 700 to 800 molar equivalents per kg and a $\eta_{rel}$ of from 1.5 to 1.6 (as measured on a 1% solution in 96% sulfuric acid), are then subjected to final condensation in the solid phase for 7 hours at 210° C. until the desired viscosity is reached, using superheated steam as inert gas. The total number of end groups is 130 to 150 molar equivalents per kg, the $\eta_{rel}$ is 2.7 to 2.8, as measured on a 1% solution in 96% sulfuric acid, and the DSC melting point is 304° C.

We claim:

1. A process for the preparation of a linear polyamide formed from a diamine having from 4 to 15 carbon atoms and a dicarboxylic acid having from 4 to 15 carbon atoms, wherein
    a) a diamine having from 4 to 15 carbon atoms and a dicarboxylic acid having from 4 to 15 carbon atoms are reacted in a liquid reaction medium at elevated temperature, a catalytically effective phosphorus compound being added to produce a solution, suspension or dispersion of the salt of said diamine and dicarboxylic acid, which solution, suspension or dispersion has a content of catalytically effective phosphorus compound,
    b) the solution, suspension or dispersion of the salt of said diamine and dicarboxylic acid having a content of catalytically effective phosphorus compound, as obtained in a), is treated to remove the reaction medium to produce a solid salt of the said diamine and dicarboxylic acid, which salt has a content of catalytically effective phosphorus compound,
    c) the solid salt of said diamine and dicarboxylic acid having a content of catalytically effective phosphorus compound, as obtained in b), is heated in the solid phase to a temperature of from 130° C. to 5° C. below the melting point of said salt in an inert gas to produce a precondensate having a total number of end groups ranging from 5,000 to 12,000 and
    d) condensation of the resulting precondensate is continued at a temperature above the temperature in stage c) until the desired degree of condensation is reached.

2. A process as defined in claim 1, wherein the catalytically effective phosphorus compound is added in an amount of from 0.01% to 1.0% w/w, calculated as phosphorus and based on the solid salt derived from said diamine and dicarboxylic acid.

3. A process as defined in claim 1, wherein hypophosphorous acid or a derivative thereof is added.

4. A process as defined in claim 1, wherein the reaction in stage a) is in aqueous medium.

5. A process as defined in claim 1, wherein the temperature for the condensation in stage c) is maintained at from 140° C. to 10° C. below the melting point of the salt in question.

6. A process as defined in claim 1, wherein the inert gas in stage (c) is superheated steam.

7. A process as defined in claim 1, wherein condensation is continued in stage d) in the solid phase at a temperature ranging from above the melting point of the salt in question to 10° C. below the melting point of the polyamide.

8. A process as defined in claim 1, wherein the temperature in stage d) is increased in stages at increments of from 5° to 15° C.

9. A process as defined in claim 1, wherein an inert gas is in stage d).

10. A process as defined in claim 1, wherein the precondensate obtained in stage c) is melted and granulated and the resulting granules are condensed further in the solid phase in an inert gas.

11. A process as defined in claim 1, wherein the precondensate obtained in stage c) is melted and condensed further in the molten state.

* * * * *